Nov. 17, 1964  P. H. WILSON  3,157,556

CLAMP

Original Filed March 25, 1957

INVENTOR
PAUL H. WILSON
BY
Carpenter, Abbott, Coulter & Kinney
ATTORNEYS

Patented Nov. 17, 1964

3,157,556
CLAMP
Paul H. Wilson, Maplewood, Minn., assignor to Minnesota Mining and Manufacturing Company, a corporation of Delaware
Original application Mar. 25, 1957, Ser. No. 648,073, now Patent No. 3,070,195, dated Dec. 25, 1962. Divided and this application Feb. 14, 1962, Ser. No. 173,196
4 Claims. (Cl. 156—583)

This invention relates to the assembling of preformed panels into walls and other structural assemblies, as in the erection of pre-fabricated buildings. The invention relates to the novel wall or other assembled structure, and to novel components, methods, and apparatus employed in the assembling thereof.

This application is a division of my application Serial No. 648,073, filed March 25, 1957, now Patent No. 3,070,195.

One type of pre-formed wall panel which has a number of points of superiority over other known panels is the so-called "sandwich" type panel consisting of two thin metal plates separated and bonded together by an intervening reinforcing cell-like structure forming the filler of the sandwich. A honeycomb structure of resin-treated paper, the ends of the hexagonal cells being firmly adhesively bonded to the metal panels, is a preferred type of filler. Panels having over-all dimensions of four feet by eight feet and a thickness of three inches are typical. The metal plates forming the outer surfacings of the panel may for example, be plates of aluminum alloy having a thickness of .032 inch, and the maximum distance across each cell of the intervening honeycomb separator may be about one inch, the separator being formed of 70 lb. kraft paper containing about 18% by weight of phenolic resin. These components are bonded together with a thermosetting phenolic resin adhesive to form a unitary panel of excellent strength and heat-insulating properties.

A number of suggestions have previously been made for connecting these sandwich-type panels in providing wall assemblies. The edges may be butted together and the metal nailed to an interiorly positioned connecting wooden beam or post; but the heads of the nails or other fasteners then remain visible and detract from the appearance of the wall structure. The metal panels may be folded over and clamped together with a fastening strip having a flattened C-shaped cross-section; but the folded edges do not fit tightly together and the assembly is unstable. Folding the edges outwardly makes possible the direct fastening together of the extended flanges, e.g., with bolts, screws, or clamps; but these are unsightly and must be covered.

Another proposed system involves forming an inwardly facing double right-angle fold at the edges of each metal plate, to provide reinforced flat edge surfaces which may be abutted against the corresponding edge surfaces of adjacent panels and sealed in place with metal C-strips or more complicated means. Obviously these internal edges are difficultly accessible, and elaborate sealing means have been evolved in an effort to operate successfully within the space provided. One such sealing means requires a metal connection between opposing face-plates and thus provides an undesired heat-conductive path between inner and outer wall surfaces. The flat edges are not truly planar but have rippled or uneven surfaces which do not fit together to form a liquid-tight seal, and the assembly tends to loosen under application of variable pressures or vibration.

The present invention provides means for overcoming these and other prior art deficiencies and results in a fluid-tight, dust-proof, strong, pressure-resistant and vibration-resistant, smooth and esthetically acceptable wall structure of bonded pre-formed sandwich type panels. The invention provides a new type of panel edge structure which is adapted for immediate bonding. Means for effecting the desired strong and resistant bond between panel edges in the assembling of a wall or other building element are also provided. Elongate clamping apparatus for applying the required heat and pressure at the panel edges within the wall section in thus bonding together adjoining wall components is included and forms the subject of the present application.

The invention will now be further described and illustrated in connection with the accompanying drawings, in which.

Figure 1:
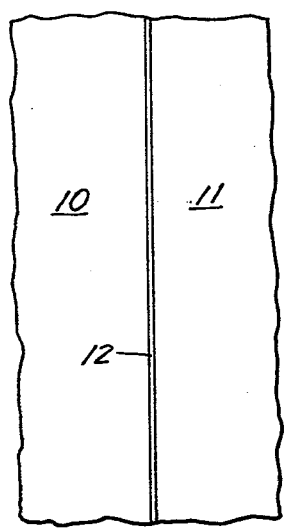
FIGURE 1 is a partial elevation representing the bonded panel structure.

The segment illustrated in FIGURE 1 consists of two pre-fabricated panels 10 and 11 permanently adherently sealed and bonded together along a joint area 12.

Figure 2:
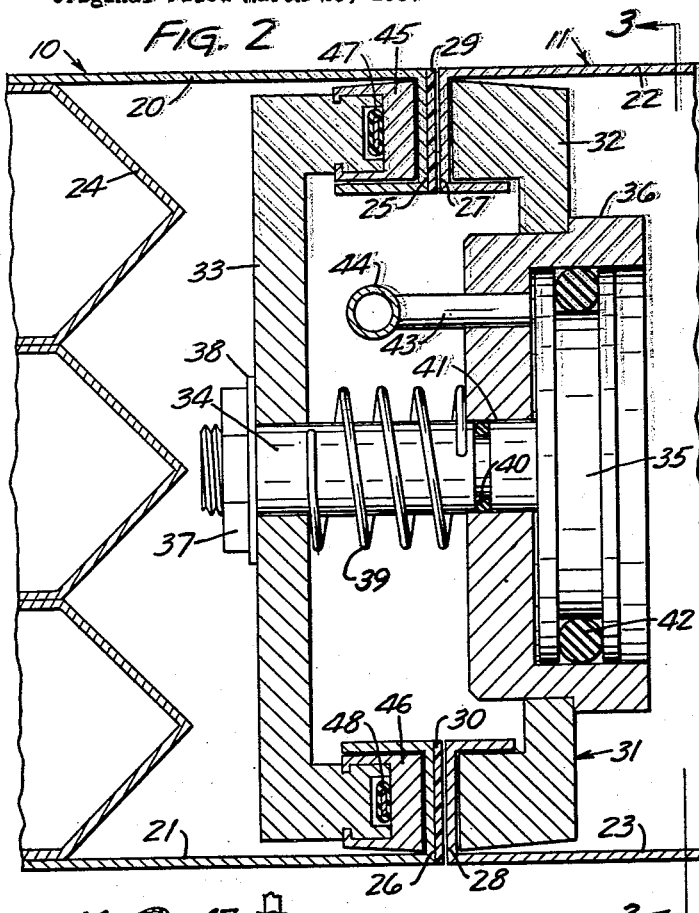
FIGURE 2 is a view in cross-section of a typical clamp member in position for, and just prior to bonding together of adjacent pre-fabricated panels.
Figure 3:
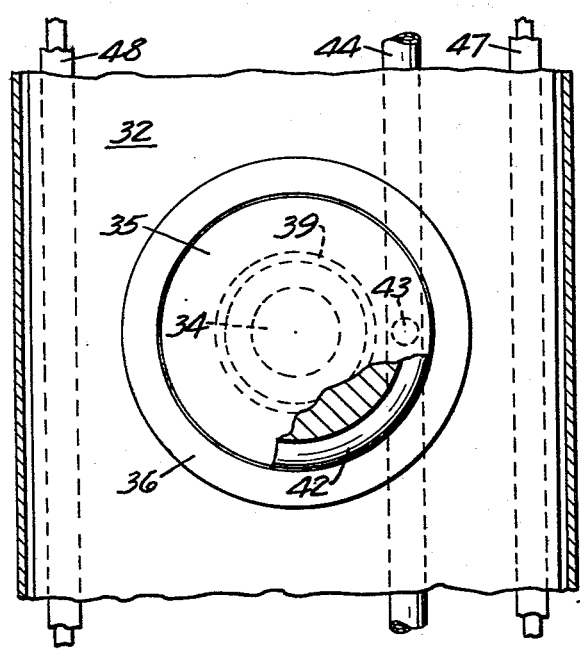
FIGURE 3 is a view in elevation and partly in section taken along the line 3—3 of FIGURE 2.

The panels 10 and 11 are illustrated in FIGURE 2 as consisting of sheet aluminum facing elements 20, 21, 22 and 23, the elements of each panel being separated and held in position as shown in connection with panel 10, by an intervening honeycomb structure of resin treated paper 24. For descriptive purposes the edges of the hexagonal honeycomb cells are here illustrated; however these cells are normally aligned perpendicularly to the panels 20, 21 rather than parallel thereto. The abutting edges of the metal facing elements are doubly folded at right angles to provide reinforced facing edges 25, 26, 27 and 28. A strip of temporarily heat-softening thermosetting adhesive film 29 is applied to face 25 and a similar strip 30 to face 26. The two panels 10 and 11 are then placed in position as indicated, and the opened clamp 31 is slid between the abutting facing elements and over the abutting folded edges, all as indicated in FIGURE 2. Clearances, while small, are adequate to permit the clamp to be slid the full distance of the panel edge, i.e., up to a total of at least eight feet.

The clamp 31 comprises two frame members 32 and 33, in the general form of shallow U-beams or channel-irons having cooperatively opposing flange edges, held together at periodic intervals by pressure imparting means here indicated as comprising a shaft 34 passing through the web of beam 33 and connected to a piston 35 fitting within a cylinder 36 in the web of beam 32.

The shaft 34 is held to the member 33 by external fastening means here shown as nut 37 and washer 38, and by internal expansion spring 39. A sealing ring 40 is provided in a suitable channel in the shaft 34, forming a seal against the walls of opening 41 in the base of the cylinder 36. A similar sealing ring 42 is provided on the periphery of the piston 35, forming a seal against the interior of the surface of the cylinder 36.

The interior of the cylinder is connected through tube 43 to a supply tube 44 which in turn is connected to a source of hydraulic pressure.

The flanges of the U-beam 33 are shown in FIGURE 2 to be fitted with heat conductive shoe members 45, 46, and to be provided with channels underlying said shoe members and containing heater elements 47, 48. Similar structure may be employed on the flanges of the U-beam member 32 if desired.

In operation, the opened clamp member 31 is slid into position within the previously prepared joint area. The clamp is of sufficient length to fit over the entire joint area of the two panels 10 and 11, and the number of pressure units is sufficient to provide for uniform pressure along the entire edge areas. The heater elements 47, 48 are connected to a source of current, and the supply tube 44 is attached to a hydraulic pump system, not shown. Application of hydraulic pressure from the pump system causes the clamp to close and forces the folded edges of the panels together against the intervening strips of adhesive film, as is apparent by reference to FIGURE 1 of the drawing. The heating effect provided through the elements 47, 48, first causes the film to soften and, under the pressure imparted by the clamp, to flow into full contact with all surfaces, and then to cure to the final tough and adherent stage. As soon as the cure is completed, the current is turned off in the heat elements and the hydraulic pressure is released. The spring 39 then forces the U-beams 32 and 33 apart, and the clamp may be slid from the assembly.

Various heat-setting adhesives in film form are known which are capable of forming the required high strength adherent bond to aluminum. One preferred film comprises a rubbery butadiene-acrylonitrile polymer, an oil-soluble heat-advancing phenol-aldehyde resin, and a small proportion of a rapidly reacting heat-activated curing agent such as 2,6-dibromomethyl-4-methylphenol. Typical adhesives of this character are described in Palmquist et al. Patent No. 2,726,222.

The adhesive film in narrow strip form is first lightly adhered to one of the surfaces to be bonded, as indicated in FIGURE 2. The film may be "spot-welded" to the clean surface, for example by light pressure with a heated soldering-iron or the like at intervals. A preferred procedure involves wiping the metal surface with a suitable volatile solvent, e.g., methyl isobutyl ketone, and then pressing the film against the still damp surface. The solvent removes any oil deposits remaining on the metal, activates the surface of the film to a temporarily tacky state, and thereby provides continuous adherent contact between film and metal. In FIGURE 2 the film strips 29, 30 are shown adhered to the reinforced flat edges 25, 26 respectively. Obviously the film could equally well be adhered to the opposing faces 27, 28 or to one face of each panel, providing the heating elements are appropriately disposed in the clamp. Since the film is separately prepared, it is of uniform thickness and smooth-surfaced, so that well-fitting joints become possible. The panels are conveniently supplied with the bonding strips in place on appropriate surfaces and protected with a removable liner, e.g., of treated fabric or paper.

Application of hydraulic pressure to the piston and cylinder members of the clamp 31 forces the edges of the panels together. The heat supplied by the cables 47, 48 causes the bonding strips to temporarily soften and become firmly adherently attached to the metal, and then to rapidly set up or cure to an effectively non-thermoplastic or heat-resistant and extremely strong state. Thereafter the heating may be discontinued and the clamp relaxed and removed.

With the adhesive film formulation given hereinabove, the cure is so rapid that but little heating of the clamp occurs. With less rapid cures and consequent longer cure cycles it is desirable to employ heater elements beneath or at the surface of both of the opposing clamp members, and also to provide insulating means for reducing the flow of heat into other parts of the clamp. For the latter purpose, ceramic or asbestos inserts beneath the heater elements are contemplated. Ceramic shoes may be placed over the heat-conductive metal edges of U-beam 32, or heat-insulating annular connector elements may be used to isolate cylinder 36 from beam 32 and rod 34 from beam 33. However these devices are ordinarily not required where sufficiently rapidly heat-reactive bonding film is available.

An exemplary clamp member useful in joining sandwich type panels as herein described is eight feet in length and has a piston and cylinder assembly every four inches along its length. The clamp is capable of providing pressures of the order of 400 lbs. per sq. in. when operating on panel faces having a width of approximately one-half inch and at a hydraulic pump pressure of about 150 lbs. per sq. in. At these pressures the temporary heat-softened bonding film flows sufficiently to make adequate adhesive contact with the opposing metal surfaces and to fill all low areas in the panel edges; and any unduly deformed or imperfect metal edges are themselves straightened and conformed.

When the bonding film has been heat-cured under conditions such as hereinbefore described there results a strong permanent bond which is impervious to entry of dust or fluids and is highly resistant to bending and vibration. Typical panel assemblies made in this manner have exceeded the performance ratings under wind load test and vertical or column load test as prescribed by the Housing and Home Finance Agency in its "Performance Standards for Load Bearing Walls" (1947). The wall panel assembly thus provides adequate mechanical strength for housing requirements. It is also an effective heat insulator, since there are no heat-conductive connections between the metal facing sheets. The extremely narrow seam or joint area may be smoothed off to remove any extruded bonding material and is then not displeasing in appearance, and may be further concealed by painting.

What I claim is:

1. An elongate compact clamp member fitting between, and adapted for use in adherently bonding together, two structural panel members in the assembling of a bonded multiple-panel wall structure as herein described and wherein each panel member comprises two parallel thin sheet metal surface or skin elements separated and supported by an interposed insulative supporting structure, the two elements being oppositely doubly edge folded to provide extended narrow flat reinforced edges for cooperatively connecting with the corresponding edges of an adjacent panel, said edges being directed toward the interior of the panel and being separated from each other; said clamp member comprising first and second elongate shallow U-beams having continuous opposing flat edge portions forming two pairs of jaw elements; and, compactly disposed between said beams, multiple pressure-applying means for forcing together the opposing jaw elements to impart substantially uniform high unit pressure across cooperating sets of panel edges therebetween, and means for separating the opposing jaw elements on release of said pressure-applying means.

2. An elongate compact clamp member fitting between, and adapted for use in adherently bonding together, two structural panel members in the assembling of a bonded multiple-panel wall structure as herein described and wherein each panel member comprises two parallel thin sheet metal surface or skin elements separated and supported by an interposed insulative supporting structure, the two elements being oppositely doubly edge folded to provide extended narrow flat reinforced edges for cooperatively connecting with the corresponding edges of an adjacent panel, said edges being directed toward the interior of the panel and being separated from each other; said clamp member comprising first and second elongate shallow U-beams having continuous opposing flat edge portions forming two pairs of jaw elements; and, compactly disposed between said beams, multiple hydraulic pressure means for forcing together the opposing jaw elements to impart substantially uniform high unit pressure across cooperating sets of panel edges therebetween, means for supplying heat at the surface of at least one of each pair of jaw elements, and means for separating the opposing jaw elements on release of said pressure means.

3. An elongate compact clamp member fitting between, and adapted for use in adherently bonding together, two structural panel members in the assembling of a bonded multiple-panel wall structure as herein described and wherein each panel member comprises two parallel thin sheet metal surface or skin elements separated and supported by an interposed insulative supporting structure, the two elements being oppositely doubly edge folded to provide extended narrow flat reinforced edges for cooperatively connecting with the corresponding edges of an adjacent panel, said edges being directed toward the interior of the panel and being separated from each other by a thin strip of temporarily thermoplastic rapidly heat-curable adhesive film; said clamp member comprising first and second heat-conductive metallic frame members in the form of elongate shallow U-beams or channel-irons positioned with the flange edges of said first member opposing the flange edges of said second member to provide two pairs of jaw elements; heater means associated with at least one jaw element of each of said pairs for supplying heat at the corresponding of said flange edges; insulating means for minimizing heat flow within said frame members toward web portions thereof; and compactly disposed between said frame members, multiple hydraulic pressure applying means uniformly spaced along the webs of said frame members for forcing opposing jaw elements of each pair towards each other with substantially uniform high unit pressure, and compression spring means for separating the opposing jaw elements on release of hydraulic pressure.

4. A clamp assembly as herein described and comprising: a first and a second narrow shallow elongate channel-iron, the open faces of the two facing each other with the flange edges of the first opposing the flange edges of the second to provide two pairs of elongate opposing jaw elements and a central channel therebetween; a series of uniformly closely spaced open-ended shallow cylinders disposed along and attached to the web of said first channel-iron, each of said cylinders being provided with a central opening through the closed end thereof and communicating with said channel; a piston in each said cylinder; a connecting-rod for each said piston, slidably passing through the central opening in the closed end of the said cylinder and across said channel and attached to the web of said second channel-iron; a coiled compression spring surrounding each said connecting-rod for urging said channel-irons apart to the extent permitted by said rods; and a vent to the interior of each said cylinder for communicating with a source of hydraulic pressure available within said channel in the applying of hydraulic pressure to said pistons within said cylinders whereby to urge said opposing jaws strongly and uniformly toward each other.

References Cited in the file of this patent
UNITED STATES PATENTS

| | | |
|---|---|---|
| 1,890,114 | Fulton | Dec. 6, 1932 |
| 2,644,194 | Fill | July 7, 1953 |
| 2,651,350 | Casey et al. | Sept. 8, 1953 |